United States Patent
Trangbaek

(10) Patent No.: US 10,065,474 B2
(45) Date of Patent: Sep. 4, 2018

(54) VEHICLE WITH SUSPENSION FORCE DECOUPLING SYSTEM

(71) Applicant: GM GLOBAL TECHNOLOGY OPERATIONS LLC, Detroit, MI (US)

(72) Inventor: Klaus Trangbaek, Moshav Ein Vered (IL)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/374,432

(22) Filed: Dec. 9, 2016

(65) Prior Publication Data

US 2018/0162187 A1 Jun. 14, 2018

(51) Int. Cl.
| | |
|---|---|
| *B60G 11/16* | (2006.01) |
| *B60G 17/0165* | (2006.01) |
| *B60G 7/00* | (2006.01) |
| *B60G 17/016* | (2006.01) |
| *B60G 17/019* | (2006.01) |
| *B60G 17/02* | (2006.01) |
| *B60G 17/015* | (2006.01) |

(52) U.S. Cl.
CPC ......... *B60G 17/0165* (2013.01); *B60G 7/006* (2013.01); *B60G 11/16* (2013.01); *B60G 17/0155* (2013.01); *B60G 17/0157* (2013.01); *B60G 17/0162* (2013.01); *B60G 17/0164* (2013.01); *B60G 17/01908* (2013.01); *B60G 17/021* (2013.01); *B60G 2200/14* (2013.01); *B60G 2202/12* (2013.01); *B60G 2202/412* (2013.01); *B60G 2202/413* (2013.01);
(Continued)

(58) Field of Classification Search
CPC ............ B60G 17/0165; B60G 17/0157; B60G 17/0155; B60G 17/021; B60G 17/01908; B60G 17/0162; B60G 17/0164; B60G 7/006; B60G 11/16; B60G 2202/422; B60G 2202/413; B60G 2400/821; B60G 2202/12; B60G 2200/14; B60G 2400/104; B60G 2400/102; B60G 2204/62; B60G 2204/127; B60G 2204/1244; B60G 2202/442; B60G 2202/412; B60G 2400/106; B60G 2204/143
See application file for complete search history.

(56) References Cited

U.S. PATENT DOCUMENTS

| | | | | |
|---|---|---|---|---|
| 5,004,079 | A * | 4/1991 | Ivers | ......................... F16F 9/46 188/266.5 |
| 5,660,255 | A * | 8/1997 | Schubert | ................. E04B 1/985 188/378 |

(Continued)

*Primary Examiner* — Drew J Brown
(74) *Attorney, Agent, or Firm* — Quinn IP Law

(57) ABSTRACT

A vehicle includes a vehicle body, a road wheel, and a suspension corner connecting the road wheel to the vehicle body. The suspension corner includes a suspension arm connected to the road wheel and to the vehicle body, and also includes a suspension force decoupling system disposed on an axis extending between the suspension arm and the vehicle body. The suspension force decoupling system includes an actuator having an actuator mass arranged on the axis that is configured to output an actuator force in opposite directions along the axis in response to an actuator control signal. The system also includes a compliant element connected along the axis to the actuator mass and one of the body and the suspension arm, and providing a predetermined level of mechanical compliance. A controller determines and generates the actuator force in response to a threshold acceleration of the vehicle body.

20 Claims, 3 Drawing Sheets

(52) U.S. Cl.
CPC .. *B60G 2202/422* (2013.01); *B60G 2202/442* (2013.01); *B60G 2204/127* (2013.01); *B60G 2204/1244* (2013.01); *B60G 2204/143* (2013.01); *B60G 2204/62* (2013.01); *B60G 2400/102* (2013.01); *B60G 2400/104* (2013.01); *B60G 2400/106* (2013.01); *B60G 2400/821* (2013.01)

(56) References Cited

U.S. PATENT DOCUMENTS

| | | | | |
|---|---|---|---|---|
| 5,931,879 | A * | 8/1999 | Neumann | B60G 17/018 280/5.5 |
| 6,032,770 | A * | 3/2000 | Alcone | F16F 7/1011 188/378 |
| 2009/0095584 | A1* | 4/2009 | Kondo | B60G 11/15 188/267 |
| 2011/0025000 | A1* | 2/2011 | Inoue | B60G 17/0157 280/5.507 |
| 2012/0187640 | A1* | 7/2012 | Kondo | B60G 11/58 280/5.514 |
| 2014/0001717 | A1* | 1/2014 | Giovanardi | B60G 17/0165 280/5.518 |
| 2015/0231942 | A1* | 8/2015 | Trangbaek | F16F 15/03 267/195 |
| 2016/0347144 | A1* | 12/2016 | Suissa | B60G 17/0165 |
| 2017/0137023 | A1* | 5/2017 | Anderson | B60W 30/02 |

* cited by examiner

VEHICLE WITH SUSPENSION FORCE DECOUPLING SYSTEM

INTRODUCTION

Suspension systems of contemporary vehicles and other wheeled mobile platforms may be used at the corners of the vehicle's body or chassis. Corner suspension systems generally include springs, shock absorbers, and various linkages that connect the vehicle body to the vehicle's road wheels. Because a majority of the forces acting on the vehicle body are transmitted through contact patches between the road surface and the tires of the road wheels, one of the main objectives of a corner suspension system is to maintain contact or "grip" between the road wheels and the road surface.

Vehicle suspension systems contribute to ride comfort and isolation from road noise, bumps, and vibration, as well as road-holding/handling and braking performance. Because these objectives are generally at odds with each other, the tuning or configuration of a given corner suspension system involves finding an optimal comfort-grip tradeoff appropriate to the vehicle's intended purpose. For example, a corner suspension system for a sporting vehicle may be tuned to forgo some amount of ride comfort in exchange for enhanced grip and operator control, while a corner suspension system for a luxury vehicle may be tuned to achieve the opposite outcome.

SUMMARY

A force decoupling system is disclosed herein that is usable as part of a corner suspension system of a vehicle, i.e., a motor vehicle or other wheeled mobile platform. The force decoupling system integrates tuned mass damping characteristics with active suspension components by connecting a controllable/active suspension actuator to the vehicle body and/or a suspension arm of a corner suspension system via one or more suitable compliant elements, such as but not limited to a coil spring. The present approach is intended to optimize the comfort-grip tradeoff noted above by decoupling actuator forces from vehicle body accelerations experienced while traveling on a road surface, particularly at road noise/vibration frequencies approximating the "wheel hop" frequency for the vehicle.

The term "wheel hop" as used herein refers to a phenomenon in which the road wheels may tend to shake or vibrate due to effects of vertical oscillation of the unsprung mass of the suspension system, i.e., the mass of the road wheel and suspension arm. Such vertical movement may cause grip fluctuations to occur at the road surface. The system disclosed herein is thus intended to improve performance of existing corner suspension systems by enabling targeted force decoupling in a predetermined frequency range, such as the frequency range corresponding to the wheel hop frequency.

By using a suspension actuator as a free body as set forth herein, the actuator force may be effectively decoupled from vertical body accelerations so as to improve overall ride comfort across all road vibration frequencies. Suspension performance may therefore be "tuned" via proper selection of the masses of the suspension actuator and the compliance characteristics of the coil springs or other mechanically compliant elements described herein. Unlike traditional rubber bushing configurations providing passive mechanical compliance levels of more than 500 N/mm, the present approach purposefully uses mechanically compliant elements providing a much lower or "softer" compliance level, e.g., 20 N/mm-50 N/mm, so that resonant frequencies experienced from road vibrations approach the vehicle's wheel hop frequency, typically on the order of about 9-13 hertz (Hz).

A particular example embodiment of a vehicle as disclosed herein includes a vehicle body, a road wheel, and a suspension corner. The road wheel maintains contact with a road surface. The suspension corner connects the road wheel to the vehicle body, and also maintains contact between the road wheel and the road surface. The suspension corner includes a suspension arm connected to and extending between the road wheel and the vehicle body, and also a suspension force decoupling system disposed on an axis extending between the suspension arm and the vehicle body. Each corner of the vehicle may be equipped with a similar suspension corner, each of which may be identically or differently configured to provide the desired suspension performance.

The suspension force decoupling system includes a suspension actuator having an actuator mass arranged on the axis. The actuator is configured to output an actuator force along the axis to extend, retract, or otherwise move the actuator mass in response to an actuator control signal. The system also includes one or more compliant elements connected along the axis to the actuator mass and to the vehicle body and/or to the suspension arm, with each of such elements providing a predetermined mechanical compliance level. A controller determines and generates the actuator force in response to threshold accelerations of the vehicle body indicative of road vibrations, which may be detected via one or more sensors and reported to the controller. In this manner, the actuator force may be effectively decoupled from the road vibrations in a predetermined frequency range, e.g., about 9-13 Hz when the predetermined frequency range is a wheel hop frequency range of the vehicle.

The suspension actuator may be variously embodied, by way of some non-limiting examples, as a linear motor, a rotary motor such as a motorized screw assembly, a hydraulic actuator, a controlled damper, or a hydro-pneumatic piston. Semi-active embodiments may include magneto-rheological or electrorheological fluid-based devices.

The above features and advantages, and other features and advantages of the present disclosure, will be readily apparent from the following detailed description of the embodiment(s) and best mode(s) for carrying out the disclosure when taken in connection with the accompanying drawings and appended claims.

DETAILED DESCRIPTION

Figure 1:
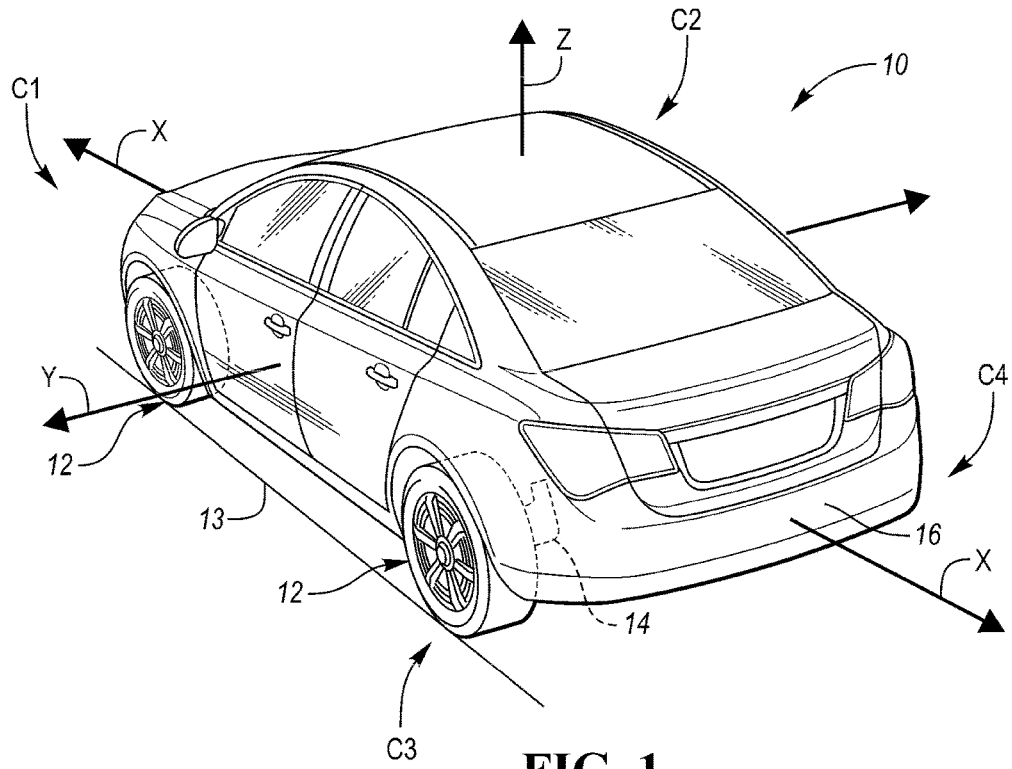
FIG. 1 is a schematic perspective view illustration of an example vehicle having individual corner suspension using a suspension force decoupling system according to the present disclosure.

Referring to the drawings, wherein like reference numbers refer to like components, FIG. 1 provides a schematic view illustration of an example vehicle 10 having a plurality of road wheels 12 in rolling contact with a road surface 13. The vehicle 10 includes a vehicle body 16 arranged with respect to a vertical (Z), longitudinal (X), and transverse/lateral (Y) axis in an example XYZ Cartesian coordinate system. In the example embodiment of FIG. 1, the vehicle 10 has four corners C1, C2, C3, and C4. Each of the road wheels 12 is disposed at one of the corners C1-C4, and is operatively connected to a suspension force decoupling system 14 as described herein. Although four road wheels 12 and thus four corners C1-C4 are shown in FIG. 1, a vehicle 10 having fewer or more road wheels 12 may be envisioned within the scope of the present disclosure.

Although omitted from the Figures for illustrative simplicity, the vehicle 10 also includes a powerplant configured to generate a drive torque for propelling the vehicle 10. Such a powerplant may include an internal combustion engine, one or more motor/generators, and/or a fuel cell, neither of which are specifically shown, but a powerplant including such devices would be appreciated by those skilled in the art. Torque from the powerplant propels the vehicle 10 along the road surface 13, with the vehicle body 16 experiencing acceleration in the X, Y, and/or Z directions in response to road noise and vibration. The suspension force decoupling system 14 is therefore configured as described herein to optimize ride comfort and grip of the road wheels 12 on the road surface 13 in the face of such road vibration, and particularly at lower frequencies approaching or overlapping the wheel hop frequency noted above, e.g., about 9-13 hertz (Hz).

The suspension force decoupling system 14 may act as part of a larger vehicle corner suspension system, elements of which are shown schematically in FIG. 2 and described below. Each of the systems 14 operatively connects the vehicle body 16 to a corresponding one of the road wheels 12 so as to maintain contact between the road wheels 12 and the road surface 13, and to facilitate handling of the vehicle 10. While some components of a corner suspension system are omitted from FIG. 2 for illustrative simplicity, a corner suspension system typically includes, at each corner C1-C4, one or more suspension arms 22, corresponding upper and lower ball joints, bushings 24 pivotally supporting the suspension arms 22, a steering knuckle configured to rotatably support a respective road wheel 12 via a wheel hub and bearing assembly, a primary shock absorber 190, tie rods, anti-sway bars, and torsion bars or stabilizer bars. The suspension force decoupling system 14 described herein is intended to operate in conjunction with such components to provide the disclosed force decoupling benefits.

Figure 2:
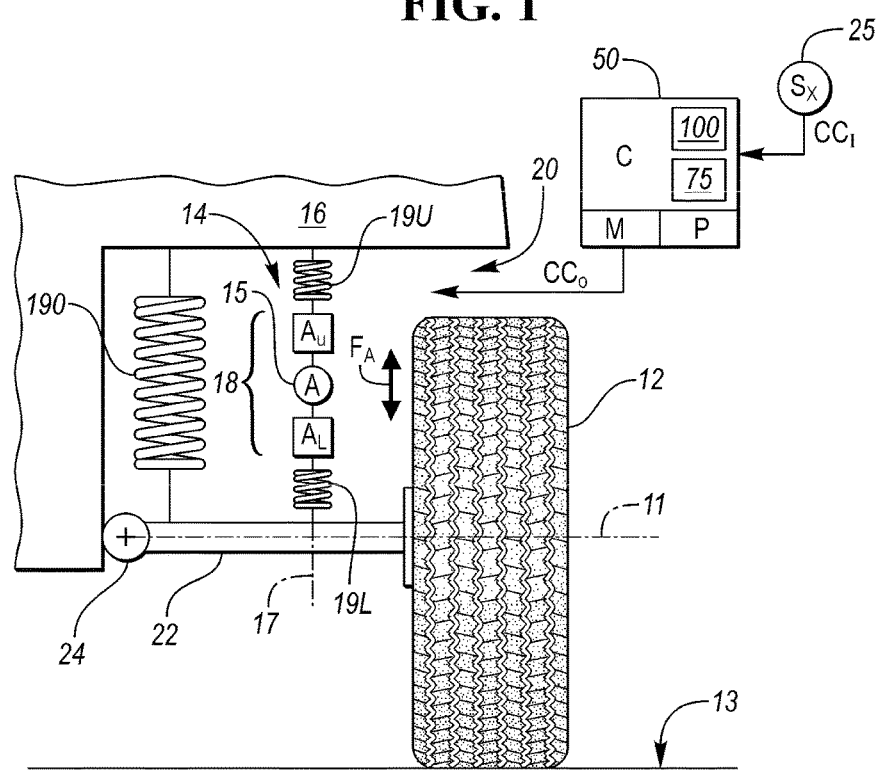
FIG. 2 is a schematic illustration of the suspension force decoupling system for a given road wheel of the vehicle shown in FIG. 1.

Referring to FIG. 2, a given corner C1, C2, C3, or C4 of the vehicle 10 shown in FIG. 1 includes the suspension force decoupling system 14, which in turn is connected within a wheel well 20 defined by the vehicle body 16 at a location adjacent to a road wheel 12. The road wheel 12 in turn rotates about an axis of rotation 11. The suspension arm 22 connects to the vehicle body 16 via a bushing 24. The bushing 24 may be mounted on the vehicle body 16 at a reinforced, load-bearing body structure location such as a vehicle sub-frame or powertrain cradle.

The suspension force decoupling system 14 includes a suspension actuator (A) 15 having one or more connected actuator masses 18. In the example embodiment of FIG. 2, the actuator masses 18 may include a first/upper actuator mass ($A_U$) and a second/lower actuator mass ($A_L$), with "upper" and "lower" referring to relative position along an axis 17 of the suspension force decoupling system 14 relative to the road surface 13, and with the axis 17 extending between the vehicle body 16 and the suspension arm 22, e.g., approximately normal to the road surface 13. The system 14 is disposed on the actuator axis 17, with the suspension arm 22 arranged in a generally orthogonal manner with respect to the actuator axis 17, e.g., within ±15 degrees of true orthogonal.

The upper and lower actuator masses ($A_U$, $A_L$) are able to be extracted/retracted along the actuator axis 17 as needed, or otherwise moved, including possible rotational movement in embodiments in which torsional compliance is desired. The suspension actuator 15 also includes first/upper and second/lower compliance elements 19U and 19L, such as fixed coil springs or dampers having a predetermined mechanical compliance level, i.e., transferring an input force or displacement imparted by the suspension actuator 15 through elastic body deformation.

As shown in FIG. 2, both of the upper and lower compliance elements 19U and 19L may be used in some embodiments. The upper compliance element 19U connects the upper actuator mass ($A_U$) to the vehicle body 16 with a first level of mechanical compliance. Similarly, the lower compliance element 19L connects the lower actuator mass ($A_L$) to the suspension arm 22 with a second level of mechanical compliance. The first and second mechanical compliance levels may be the same or different depending on the desired comfort/grip tradeoff performance, for example with the upper compliance element 19U providing a relatively low level of mechanical compliance and the lower compliance element 19L providing a relatively high level of mechanical compliance, as is the case in the non-limiting example performance plots illustrated in FIGS. 4A-C and described below. While the particular difference in compliance levels may vary with the intended function of the vehicle 10, for the purposes of illustration the lower compliance element 19L may have a compliance level of less than 90 percent of the first compliance element 19U in certain embodiments in which softer lower compliance is desirable.

The suspension actuator 15 may be variously embodied as a linear or rotary motor, such as a rotary screw assembly. Alternatively, the suspension actuator 15 may be a controlled hydraulic or hydro-pneumatic cylinder, a magneto-rheological (MR) or electrorheological (ER) device, a controlled valve, a solenoid, or other suitable active actuator configured to output an actuator force ($F_A$) axially and/or rotationally along the actuator axis 17 in response to an actuator control signal (arrow $CC_O$) from a controller (C) 50. The actuator force ($F_A$) acts equally on the upper and lower compliance elements 19U and 19L by outputting the actuator force ($F_A$) in opposite directions, and thus compresses the upper and lower compliance elements 19U and 19L against the vehicle body 16 and suspension arm 22, respectively. In this manner, the suspension force decoupling system 14 is configured to dynamically compensate for forces or loads experienced by road vibrations when the vehicle 10 is in operation.

Unlike traditional passive dampers in which calibrated masses are effectively rigidly attached to the masses of the road wheel 12 and suspension arm 22, the suspension actuator 15 of FIG. 2 is connected via compliant elements 19U and 19L above and/or below the suspension actuator 15. An optional shock absorber 190, e.g., another coil spring, may be used to carry or support the static load of the vehicle body 16 at a particular corner C1-C4, with the shock absorber 190 arranged parallel to the actuator axis 17 of the suspension force decoupling system 14 as shown, or arranged around the suspension force decoupling system 14.

As active suspension actuators such as the suspension actuator 15 of FIG. 2 are typically heavier than passive dampers, a useful amount of actuator mass 18, usually around 2-10 kg, is available to use as a tuned mass damper as set forth herein. That is, acceleration of the actuator masses 18 in a controlled manner in response to accelerations of the vehicle body 16, achieved via controlled operation of the suspension actuator 15 by the controller 50, provides targeted decoupling of the road vibration-based forces and accelerations of the vehicle body 16 experienced at the corners C1-C4 in particular frequency bands, including the low frequencies typical of wheel hop.

The controller 50 may be embodied as one or more computer devices having the requisite memory (M) and a processor (P), as well as other associated hardware and software, e.g., a clock or timer, input/output circuitry, etc. Memory (M) includes sufficient amounts of read only memory, for instance magnetic or optical memory, on which is recorded a lookup table 75 and computer-readable instructions embodying a method 100. The controller 50 is configured to execute the method 100 to thereby regulate or control operation of the suspension actuator 15 in response to input signals (arrow $CC_I$) from one or more sensors ($S_X$) 25.

As part of the present approach, the sensors 25 may measure motion of the vehicle body 16 and vertical/up-down motion of the road wheels 12, i.e., motion along the Z axis of FIG. 1, and thus may be embodied as accelerometers mounted on the vehicle body 16 and road wheels 16. The sensors 25 are configured to sense or detect accelerations indicative of cornering, forward acceleration, and/or braking of the vehicle 10 and the forces generated during such maneuvers. The sensors 25 may include individual lateral, longitudinal, and vertical acceleration sensors configured to detect acceleration as the vehicle 10 along the axes X, Y, and Z of FIG. 1. The vehicle 10 may employ a stability control system (not shown) with the sensors 25 being part of such a system. The sensors 25 are also configured to communicate a signal indicative of the particular sensed parameter to the controller 50, with the collective signals depicted in FIG. 1 as the input signals (arrow $CC_I$).

The controller 50 is configured to receive the input signals (arrow $CC_I$) from the sensors 25, for instance over a controller area network (CAN) bus or via low-voltage wires (not shown), to select a predetermined actuator force ($F_A$) from the lookup table 75 as a function of the input signals (arrow $CC_I$), and ultimately control the suspension actuator 15 based on such input signals (arrow $CC_I$) in real time, i.e., with a response time measured in milliseconds. The controller 50 is also programmed to determine changes in vehicle orientation relative to the road surface 13 as the vehicle 10 performs various maneuvers and in response to the received signals from the sensors 25, and to regulate operation of the suspension actuator 15 based on such determination. The controller 50 is thus configured to determine and generate the actuator force ($F_A$) in response to an acceleration of the vehicle body 16, e.g., as a linear function of the detected acceleration, such that force due to accelerations of the vehicle body 16 are decoupled in a predetermined frequency range, e.g., the wheel-hop frequency range of about 9-13 Hz or other desired frequency ranges.

Figure 3A:
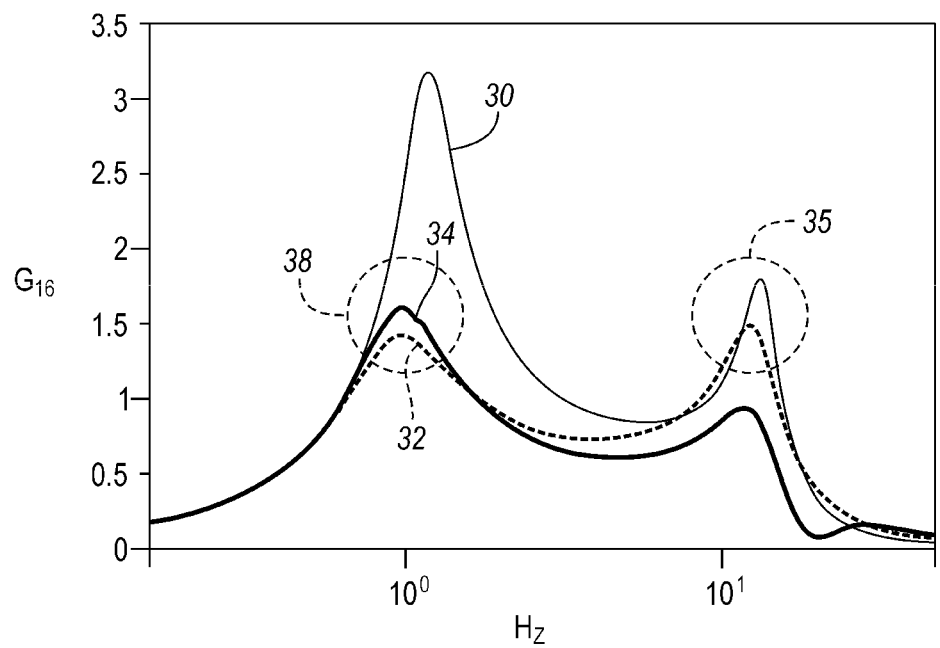
FIGS. 3A and 3B are Bode diagrams describing relative effects on ride comfort and grip, respectively, using the suspension force decoupling system of FIG. 2, with magnitude of gain and tire force variation plotted on the vertical axis and frequency plotted on the horizontal axis, respectively.
Figure 3B:
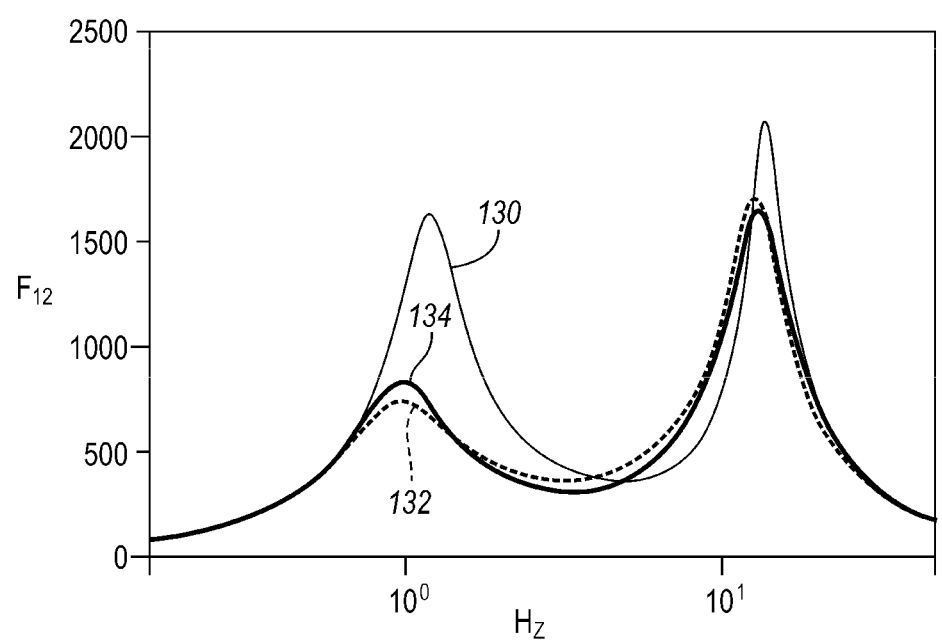

FIGS. 3A and 3B are Bode diagrams depicting, as transfer function, the comfort-grip tradeoff noted above as a response to a calibrated periodic/sinusoidal road surface vibration acceleration of 1 m/s for a given configuration of the suspension force decoupling system 14. Road noise has frequency-based effects on both comfort (vertical acceleration gain ($G_{16}$) of the vehicle body 16) as shown in FIG. 3A and grip (variations in tire normal forces, $F_{12}$) as shown in FIG. 3B. In both Figures, frequency is plotted on the horizontal axis and magnitude is plotted on the vertical axes.

Trace 30 of FIG. 3A represents corner suspension response typical of passive damping, e.g., using relatively stiff rubber bushings to connect the masses of a corner suspension system to a vehicle body such as the vehicle body 16 of FIG. 1 and relying solely on passive compliance from such bushings. Trace 32 represents an active suspension configuration in which a suspension actuator such as the suspension actuator 15 of FIG. 2 is rigidly connected to the vehicle body 16, perhaps via a hard rubber bushing. Zone 35 includes an invariant point ($P_I$), i.e., a point at which the response of the vehicle body 16 or chassis, usually around 10-11 Hz, is not improved by the use of the active suspension actuator 15 alone without adding the force decoupling disclosed herein. Trace 34 shows reduction at targeted frequencies of the road vibration response of the vehicle body 16 when using the suspension force decoupling system 14 of FIG. 2, and the departure from the invariant point ($P_I$) that such decoupling provides.

Note that in zone 38, which corresponds to about 1 Hz, trace 32 (i.e., active suspension without force decoupling as set forth herein) is slightly lower in magnitude than trace 34 (the present approach using the system 14). However, at the 10-11 Hz range indicative of resonant vibration of the vehicle body 16, acceleration of the upper and lower actuator masses $A_U$, $A_L$ of FIG. 2 provides some decoupling of forces, thus softening the compliance in targeted frequencies, e.g., at or near the wheel-hop frequency described above. As noted above, however, this benefit may come with a tradeoff in comfort at very low frequencies such as 1-2 Hz, i.e., in this example, some 1-2 Hz performance is surrendered in exchange for better 10 Hz performance. However, it may be possible to retain the 1-2 Hz performance and still improve the 10 Hz performance in other embodiments.

FIG. 3B depicts the effects of the suspension force decoupling system 14 of FIG. 2 on grip under the same loading conditions as FIG. 3A. Trace 130 represents corner suspension response typical of passive damping. Trace 132 represents a traditional active suspension configuration in which an actuator is almost rigidly connected to the vehicle body 16. Trace 134 represents the reduction at some frequencies of the road vibration response when using the suspension force decoupling system 14. As can be seen by comparing FIGS. 3A and 3B, the comfort-grip tradeoff exists, as comfort improvements between 1 Hz and 10 Hz observed in FIG. 3A result in a decrease in grip performance at the same frequency. One could tune the performance differently than is depicted to improve comfort at low frequencies and grip at high frequencies in other embodiments. Thus, the present approach may be "tuned" to the desired performance, such as softer compliance at low frequencies typical of wheel hop.

Figures 4A, 4B, 4C:
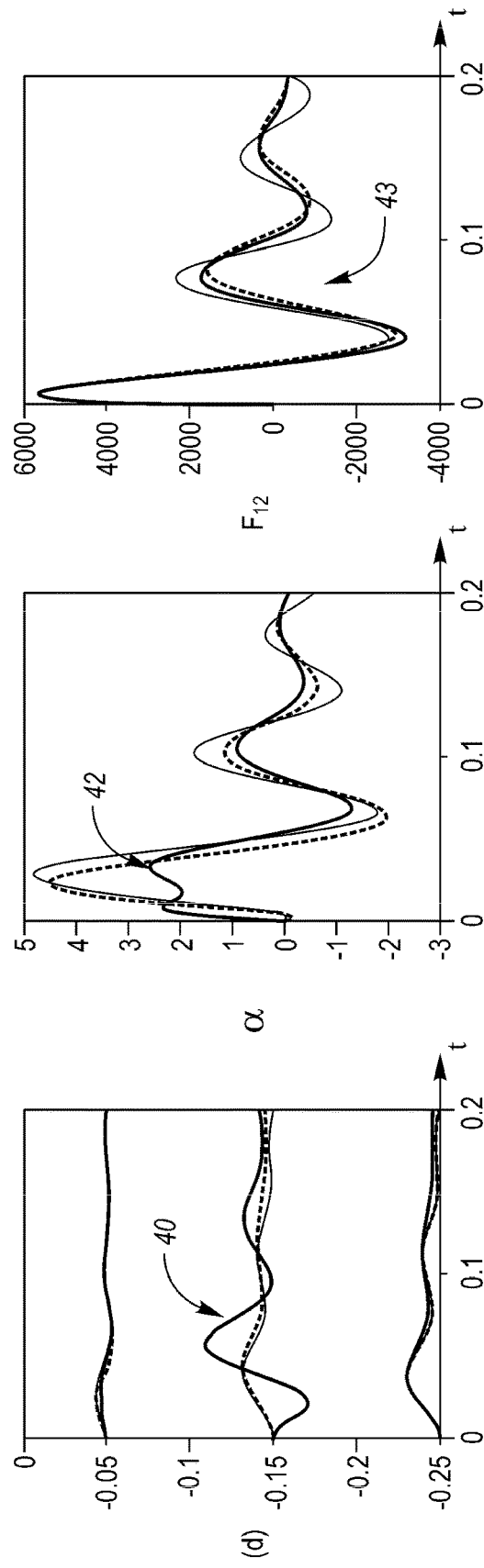
FIGS. 4A-C are example time plots of displacement, acceleration, and tire force, respectively, with magnitude plotted on the vertical axis and time plotted on the horizontal axis.

FIGS. 4A-C respectively depict time plots of actuator mass displacement (d) in meters (m) relative to the vehicle body 16 of FIG. 1, peak body acceleration ($\alpha$) in m/s², and tire normal forces ($F_{12}$) in newtons (N) for each of a comparative passive, traditional active suspension, and the present decoupled approach using the system 14. Additionally, FIGS. 4A-C are representative of an example embodiment of the system 14 in which the lower compliant element 19L is softer than the compliant element 19U. In other embodiments, the lower compliant element 19L may be as compliant or less compliant/harder than the upper compliant element 19U. In an example configuration, the mechanical compliance of the first compliant element is no more than about 75 percent of the mechanical compliance level of the second compliant element.

Traces 40 show the greater amount of displacement of the lower actuator mass ($A_L$) in response to a calibrated road noise input relative to displacements of a passively or traditional active suspension. Trace 41 shows that the displacement of the upper actuator mass ($A_U$) may be configured to minimize displacement of the upper mass ($A_U$) in response to a given actuator force ($F_A$), which again is imparted in response to a given input signal (arrow $CC_I$) to the controller 50. Trace 43 represents the vertical displacement of the drive wheel 12 relative to the vehicle body 16, again with insignificant different relative to passive or conventional active suspension configurations.

FIG. 4B illustrates the noticeable reduction in peak body acceleration ($\alpha$) early in the acceleration event, e.g., in the first 0.1 seconds of the acceleration event. Trace 44 illustrates such body acceleration relative to the magnitudes of performance of passive and active applications in which the actuator force ($F_A$) is not decoupled as set forth herein. FIG. 4C depicts variations in tire force ($F_{12}$) as trace 45 over the same span of time as FIGS. 4A and 4B. Zero variation is desirable. As FIG. 4C indicates, grip is maintained while reducing peak body acceleration (FIG. 4B).

Thus, the system 14 integrates tuned mass damping with active suspension to achieve force decoupling at the corners C1-C4 of the vehicle 10 of FIG. 1, specifically by connecting a suspension actuator 15 on compliant elements, e.g., coil springs, using much softer mechanical compliance levels (20 N/mm and up). By connecting a suspension actuator 15 on springs or other compliant elements, the comfort-grip tradeoff may be improved. Attendant benefits include improvements to active suspension systems and reduction in drive harshness.

While some of the best modes and other embodiments have been described in detail, various alternative designs and embodiments exist as defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a vehicle body;
a road wheel configured to contact a road surface; and
a suspension corner connecting the road wheel to the vehicle body and configured to maintain the contact between the road wheel and the road surface, the suspension corner including:
a suspension arm connected to and extending between the road wheel and the vehicle body; and
a suspension force decoupling system disposed on an axis extending between the suspension arm and the vehicle body, the suspension force decoupling system including:
first and second actuator masses arranged on the axis, the first and second actuator masses jointly exhibiting a calibrated actuator mass of about 2-10 kg;
an actuator disposed between the first and second actuator masses and arranged on the axis, the actuator configured to output an actuator force to extend or retract the first and second actuator masses along the axis in response to an actuator control signal;
first and second compliant elements each connected along the axis to a respective one of the first and second actuator masses and to a respective one of the body and the suspension arm, and each providing a respective predetermined mechanical compliance level; and
a controller configured to determine the actuator force and generate the actuator control signal in response to an acceleration of the vehicle body indicative of road vibrations, such that the actuator force is decoupled from the road vibrations in a predetermined frequency range.

2. The vehicle of claim 1, wherein the predetermined frequency range is about 9-13 hertz (Hz).

3. The vehicle of claim 1, wherein the second actuator mass is connected to the actuator and the second compliant element, and is disposed between the first compliant element and the suspension arm.

4. The vehicle of claim 1, wherein the first actuator mass is connected to the actuator and the first compliant element, and is disposed between the second compliant element and the vehicle body.

5. The vehicle of claim 1, wherein the actuator is configured to displace the second actuator mass a second distance greater than a first distance of displacement of the first actuator mass in response to a calibrated road noise input.

6. The vehicle of claim 5, wherein the predetermined mechanical compliance level of the first compliant element is less than the predetermined mechanical compliance level of the second compliant element.

7. The vehicle of claim 1, wherein the first and second compliant elements each includes a respective coil spring.

8. The vehicle of claim 1, wherein the suspension actuator is a motorized screw assembly.

9. The vehicle of claim 1, further comprising a spring connected to and extending between the vehicle body and the suspension arm on an axis that is separate from the axis of the suspension force decoupling system.

10. A suspension force decoupling system for a vehicle having a suspension arm connected to and extending between a road wheel and a vehicle body, the suspension force decoupling system comprising:
first and second actuator masses arranged on an axis extending between the suspension arm and the vehicle body, the first and second actuator masses jointly exhibiting a calibrated actuator mass of about 2-10 kg;
an actuator disposed between the first and second actuator masses and arranged on the axis, the actuator being configured to output an actuator force, in response to an actuator control signal, to thereby extend or retract the first and second actuator masses along the axis;

first and second compliant elements each connected along the axis to a respective one of the first and second actuator masses and to a respective one of the vehicle body and the suspension arm, and each providing a respective predetermined mechanical compliance level; and a controller configured to determine the actuator force and generate the actuator control signal in response to an acceleration of the vehicle body indicative of road vibrations, such that the actuator force is decoupled from the road vibrations in a predetermined frequency range.

11. The system of claim 10, wherein the predetermined frequency range is about 9-13 hertz.

12. The system of claim 10, wherein the second actuator mass is connected to the actuator and the second compliant element, and is disposed between the first compliant element and the suspension arm.

13. The system of claim 10, wherein the first actuator mass is to the actuator and the first compliant element, and is disposed connected between the second compliant element and the vehicle body.

14. The system of claim 10, wherein the actuator is configured to displace the second actuator mass a second distance greater than a first distance of displacement of the first actuator mass in response to a calibrated road noise input.

15. The system of claim 14, wherein the predetermined mechanical compliance level of the first compliant element is less than the predetermined mechanical compliance level of the second compliant element.

16. The system of claim 10, wherein the first and second compliant elements each includes a respective coil spring.

17. The system of claim 10, wherein the suspension actuator is a motorized screw assembly.

18. The system of claim 10, further comprising a spring connected to and extending between the vehicle body and the suspension arm on an axis that is separate from the axis of the suspension force decoupling system.

19. A suspension force decoupling system for a motor vehicle, the motor vehicle having a vehicle body, a road wheel, and a suspension corner, the suspension corner having a suspension arm connected to and extending between the road wheel and the vehicle body, the suspension force decoupling system comprising:

first and second actuator masses arranged on an axis extending between the suspension arm and the vehicle body, the first and second actuator masses jointly exhibiting a calibrated actuator mass of about 2-10 kg;

an actuator disposed between the first and second actuator masses and arranged on the axis, the actuator configured to output an actuator force, in response to an actuator control signal, to thereby extend or retract the first and second actuator masses along the axis, wherein the actuator is a rotary or linear actuator;

a first coil spring connected along the axis to the first actuator mass and the vehicle body, and providing a first predetermined mechanical compliance level;

a second coil spring connected along the axis to the second actuator mass and the suspension arm, and providing a second predetermined mechanical compliance level; and a controller configured to determine the actuator force and generate the actuator control signal in response to a threshold acceleration of the vehicle body indicative of road vibrations, such that the actuator force is decoupled from the road vibrations in a predetermined frequency range of about 9-13 hertz.

20. The system of claim 19, wherein the first predetermined mechanical compliance level is less than the second predetermined mechanical compliance level.

* * * * *